(12) United States Patent
Uchida et al.

(10) Patent No.: US 7,582,250 B2
(45) Date of Patent: Sep. 1, 2009

(54) INJECTION MOLDING METHOD AND INJECTION MOLDING APPARATUS

(75) Inventors: Hiroshi Uchida, Nisshin (JP);
Tadayoshi Takahara, Toyota (JP);
Tomoaki Eto, Kariya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/628,780

(22) PCT Filed: Jun. 6, 2005

(86) PCT No.: PCT/JP2005/010735

§ 371 (c)(1),
(2), (4) Date: Dec. 7, 2006

(87) PCT Pub. No.: WO2005/120800

PCT Pub. Date: Dec. 22, 2005

(65) Prior Publication Data

US 2007/0182066 A1    Aug. 9, 2007

(30) Foreign Application Priority Data

Jun. 8, 2004   (JP) .............. 2004-170400
Dec. 24, 2004  (JP) .............. 2004-373751

(51) Int. Cl.
*B29C 44/02* (2006.01)
*B29C 45/00* (2006.01)

(52) U.S. Cl. ............ 264/572; 264/328.13; 425/130; 425/555

(58) Field of Classification Search ........... 264/500, 264/572, 328.1, 328.13, 335, 336; 425/546, 425/130, 555

See application file for complete search history.

(56) References Cited

U.S. PATENT DOCUMENTS 5,653,932 A * 8/1997 Aida et al. ............... 264/219

(Continued)

FOREIGN PATENT DOCUMENTS

DE        197 46 827        10/1997

(Continued)

OTHER PUBLICATIONS

Translation of Taiwanese Office Action.

(Continued)

*Primary Examiner*—Jill L Heitbrink
(74) *Attorney, Agent, or Firm*—Finnegan, Henderson, Farabow, Garrett & Dunner, LLP.

(57) ABSTRACT

This invention relates to an injection molding method using an injection mold. The method comprises (1) a molten resin injection step for injecting the molten resin from a gate into a cavity, (2) a pressure-keeping step for continuously applying pressure from the gate after the molten resin injection step, and (3) a fluid injection step for injecting a fluid toward the back surface of the molded product. The pressure-keeping step and the fluid injection step are simultaneously executed.

Simultaneously executing these two steps can lower the pressure that is to be continuously applied from the gate. The present injection molding method can reduce the pressure of the fluid to be injected toward the back surface of the molded product in order to cause the back surface of the molded product to separate from the cavity surface.

9 Claims, 11 Drawing Sheets

U.S. PATENT DOCUMENTS

| | | | |
|---|---|---|---|
| 5,972,276 A | 10/1999 | Yasuda et al. | |
| 6,071,463 A * | 6/2000 | De'ath | 264/328.16 |
| 6,287,504 B1 * | 9/2001 | Kanematsu et al. | 264/327 |
| 6,403,014 B1 * | 6/2002 | Hendry et al. | 264/500 |
| 6,918,752 B2 * | 7/2005 | Seno et al. | 425/130 |
| 2001/0031361 A1 | 10/2001 | Kanematsu et al. | |
| 2002/0071887 A1 | 6/2002 | Seno et al. | |

FOREIGN PATENT DOCUMENTS

| | | |
|---|---|---|
| JP | 10-58493 | 3/1998 |
| KR | 100236847 B | 1/2000 |
| TW | 286627 | 9/1996 |
| WO | WO 96/02379 | 2/1996 |

OTHER PUBLICATIONS

Jaroschek C. et al., "Werkzeugtechnik Fuer Das Gashinterdruck-Verfahren Herstellung Besonders Verrippter Sprizgessteile Ohne Einfallstellen," *Kunststoffe, Hanser*, vol. 89, No. 11, Nov. 1999, pp. 64-66.

International Search Report.

Written Opinion of International Searching Authority.

Korean Office Action dated Nov. 28, 2007; Translation of Korean Office Action.

European Communication Pursuant to Article 94(3) EPC dated Dec. 13, 2007.

Australian Examiner's First Report dated Nov. 28, 2007.

Office Action dated Mar. 5, 2009, issued by the Canadian Intellectual Property Office for Canadian Patent Application No. 2,566,939.

* cited by examiner

FIG. 5

|  | Pressure of Resin ||  Pressure of Air |
|  | Gate | Terminal Area |  |
| --- | --- | --- | --- |
| Conventional Example 1 | 40MPa | 16MPa | — |
| Comventional Example 2 | — | — | 18MPa |
| Present Embodiment | 20MPa | 8MPa | 0.5MPa |

INJECTION MOLDING METHOD AND INJECTION MOLDING APPARATUS

TECHNICAL FIELD

The present invention relates to injection molding technologies.

The present application claims priority to Japanese Patent Application No. 2004-170400 filed on Jun. 8, 2004 and Japanese Patent Application No. 2004-373751 filed on Dec. 24, 2004, the contents of which are hereby incorporated by reference.

BACKGROUND ART

An injection mold is provided with a gate and a cavity connected with the gate. A molten resin is injected into the cavity from the gate. When the injected molten resin has solidified in the cavity, the mold is opened to remove a molded product from the mold.

Resin shrinks when it solidifies. When the molten resin that has been filled in the cavity shrinks during solidification, the external shape of the molded product no longer matches the shape of the cavity. It is impossible to form the molded product into the desired external shape.

To solve this problem, the following technology was developed. This technology continues to apply pressure to the molten resin within the cavity from the gate while the molten resin within the cavity is solidifying. That is, the amount of molten resin necessary to make up for shrinkage is replenished. This technology can prevent the external surface of the molded product from separating from the cavity surface, even when the molten resin shrinks. As a result, a molded product having the desired external shape can be obtained.

A technology replacing the aforementioned technology is disclosed in Japanese patent application publication No. H10-58493. This technology focuses on the fact that many molded products have both a surface that must be finished to a desired shape (this surface is called a "design surface"), and a surface whose finish is not important (this surface is called a "back surface"). In this prior art method, when the filling of the cavity with the molten resin from the gate is finished, the pressure being applied to the molten resin is stopped. A pressurized fluid is injected toward the back surface of the molded product. When the pressurized fluid is injected toward the back surface of the molded product, the back surface separates from the cavity surface, but the design surface of the molded product is pushed against the cavity surface. Consequently, the design surface of the molded product can be finished to the desired shape. It is explained that this technology does not require an extra amount of resin, since the pressure being applied to the molten resin from the gate is stopped when the cavity has been filled with the molten resin.

DISCLOSURE OF THE INVENTION

In order to form an excellent molded product using the technology that continues to apply pressure to the molten resin from the gate, it is necessary to continue applying high pressure. For example, to form an automobile bumper, it is necessary to continue applying pressure of around 16 MPa to terminal areas (areas that are distant from the gate) where shrinkage can become a problem. This makes it necessary to continue applying pressure of around 40 MPa in the vicinity of the gate. Consequently, an injection mold for the bumper must be able to withstand pressure of 40 MPa or higher. The large and expensive injection mold is required.

Even when the technology that injects a pressurized fluid toward the back surface of the molded product is used, high fluid pressure is required to form an excellent molded product. The aforementioned Japanese patent application publication No. H10-58493 injects a pressurized fluid of around 18 MPa. Therefore, the injection mold must be able to withstand pressure of 18 MPa or higher. The large and expensive injection mold is required.

The present invention reduces pressure necessary to apply to the resin within the cavity. Therefore, the pressure resistance required of the injection mold is reduced. As a result, the injection mold can be downsized, and the injection molding cost can be reduced.

In the injection molding method disclosed by this specification, an injection mold is used. The injection mold is provided with a gate, a cavity connected with the gate, a flow channel having an opening which opens toward a back surface of a molded product. In this method, a molten resin injecting step that injects the molten resin from the gate into the cavity is executed. Furthermore, a pressure-applying step for applying pressure from the gate against the injected resin within the cavity after the molten resin injecting step and a fluid injection step for injecting a fluid toward the back surface of the molded product are simultaneously executed.

The present injection molding method executes both the technology that continues to apply pressure from the gate and the technology that injects a pressurized fluid toward the back surface of the molded product. By simultaneously executing both of these technologies, the present injection molding method has succeeded in obtaining an unexpected synergistic effect. That is, it has succeeded in significantly reducing the pressure necessary for forming the desired design shape. In the example described above, if the technology that continues to apply pressure from the gate is used by itself, pressure of around 16 MPa is required at the terminal areas. If the technology that injects a pressurized fluid toward the back surface of the molded product is used by itself, pressure of around 18 MPa is required. In contrast, when both of these technologies are used simultaneously, the pressure necessary to apply from the gate in the pressure-applying step can be halved to around 8 Mpa and the pressure of only around 1 MPa becomes sufficient in the fluid injection step. Thus, both the pressure applied from the gate and the fluid injection pressure can be low. The design surface of the molded product can be formed into the desired surface shape, under conditions in which both types of pressure are low. Note that the aforementioned pressure values are merely provided as examples, and should not be taken as limiting the technical scope of the invention.

This injection molding method obtains a synergistic effect by using both the technology that the back surface of the molded product separates from the cavity surface before the design surface of the molded product separates from the cavity surface, and the technology that pressure is continuously applied to the molten resin from the gate. The step of injecting the fluid from the flow channel is one of steps of guaranteeing that the back surface of the molded product will separate from the cavity surface before the design surface of the molded product separates from the cavity surface, and another step may be used instead of the fluid injecting step.

Expressed more generally, the present injection molding method can be considered an injection molding method that simultaneously executes the pressure-applying step and a separation step for separating the back surface of the molded product from the cavity surface.

In order to guarantee that the back surface will separate from the cavity surface before the design surface separates from the cavity surface, it is also possible to use a knock-out pin or the like to mechanically separate the back surface of the molded product from the cavity surface.

BRIEF DESCRIPTION OF THE DRAWINGS

FIG. 3 (*a*) is a diagram that explains the technology that prevents the design surface of the molded product from separating from the cavity surface merely by replenishing the molten resin; FIG. 3 (*b*) is a diagram that explains the technology that prevents the design surface of the molded product from separating from the cavity surface merely by applying pressure to the back surface of the molded product; and FIG. 3 (*c*) is a diagram that explains the technology that prevents the design surface of the molded product from separating from the cavity surface by simultaneously executing the step of replenishing the molten resin and the step of applying pressure to the back surface of the molded product.

FIG. 5 is a diagram that explains the pressure necessary in the embodiment in comparison with in a conventional example.

BEST MODE FOR CARRYING OUT THE INVENTION

Figure 1:
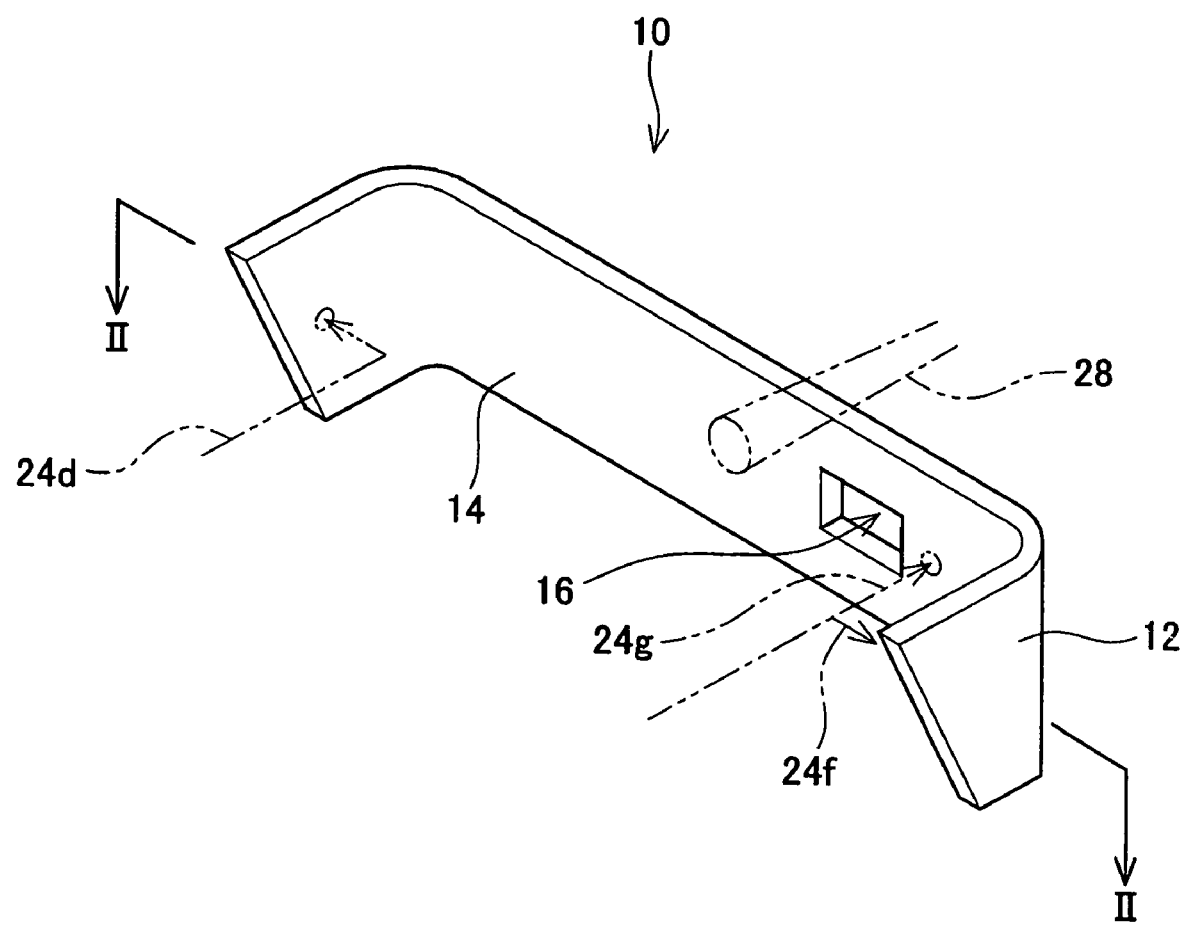
FIG. 1 is a perspective diagram illustrating an example of a molded product that is formed using the technology of an embodiment.

The following section describes a presumed reason why the pressure can be reduced by simultaneously executing the pressure-applying step and the fluid injecting step. Note, however, that the technology disclosed in this Specification is not limited by this presumed reason, and is pursuant to the objective elements described in the Claims section.

As the resin within the cavity cools and shrinks, it becomes difficult for the pressure being applied to the resin at distant portions from the gate. If the pressure being applied to the resin falls below the pressure being applied to the back surface of the resin at an opening of a flow channel of a pressurized fluid, the pressurized fluid begins to infiltrate between the back surface of the molded product and the cavity surface. This causes the back surface of the molded product to separate from the cavity surface. As a result, the back surface of the molded product is not finished with the cavity surface. However, the back surface of the molded product does not affect product performance. The pressure near the back surface of the molded product declines as the resin shrinks. Therefore, low-pressure fluid can easily infiltrate between the back surface of the molded product and the cavity surface. As the resin shrinks, the pressure near the design surface of the molded product also declines. However, the pressurized fluid enters the space between the back surface of the molded product and the cavity surface before the design surface separates from the cavity surface, and the back surface of the molded product separates from the cavity surface before the design surface separates from the cavity surface.

After the back surface of the molded product separates from the cavity surface but before the design surface shape of the molded product solidifies, pressure is continuously applied to the molten resin from the gate to prevent the design surface of the molded product from separating from the cavity surface. During this process, the back surface of the molded product, which has separated from the cavity surface, can be shrunk such that it moves toward the design surface and becomes thinner. Consequently, even if the pressure to be continuously applied to the molten resin from the gate is set lower than that required in the conventional technologies, it is possible to prevent the design surface of the molded product from separating from the cavity surface.

It is preferable to simultaneously start the pressure-applying step and the fluid injection step. It is preferable to simultaneously start the molten resin pressure-applying step and the fluid injection step immediately after the completion of the molten resin injection step. In this case, no wasteful molding time is required. However, it is also possible to present an interval between the molten resin injection step and the pressure-applying step.

Alternatively, it is also possible to start the fluid injection step without waiting for the completion of the filling of the cavity with the molten resin. That is, it is preferred that the fluid injection step is started during the molten resin injection step. In this case, the pressure-applying step is started after the fluid injection step was started.

When a molten resin is being injected into a cavity, the molten resin flows inside the cavity, with the tip of the molten resin moving. If the fluid injection step is to be started without waiting for the completion of the molten resin injection step, it is preferable to start the fluid injection step after the tip of the molten resin flowing inside the cavity has passed through the opening of the flow channel. In this case, it is preferable to start the fluid injection step after the tip of the molten resin has passed through the opening but before the molten resin begins to shrink. In this case, it is possible to allow the molten resin to continue solidifying, with the back surface of the molded product separated from the corresponding cavity surface. This allows the design surface to be finished to the desired shape.

The cavity surface facing the back surface of the molded product may be formed by combining multiple divided molds in some cases. Consequently, bumps sometimes occur at these divided molds. If bumps are present on the cavity surface, even on the back surface, the thickness of the molded product changes abruptly. As a result, shrinking does not proceed evenly. Then even when the design surface of the cavity is smooth, distortion corresponding to the bumps on the back surface can appear on the design surface of the molded product. With the present injection molding method, bumps of divided molds on the back surface side of the molded product do not affect the thickness of the molded product. Thus, the distortion can be suppressed.

After the molten resin pressure-applying step has been finished, it is preferable to continue the fluid injection step. If the fluid injection step is continued, even if the resin shrinks on the design surface side of the molded product, this shrinking will not cause the design surface to separate from the cavity surface. That is, since a fluid is injected from the flow channel, it is possible to maintain a state in which the design surface does not easily separate from the cavity surface. Therefore, the resin pressure-applying time can be significantly reduced, resulting in a significantly shorter cycle time.

It is preferable to create a state in which the design surface does not separate from the cavity surface by both the pressure applied in the pressure-applying step and the pressure applied in the fluid injection step. Even when the pressure in the pressure-applying step and the pressure in the fluid injection step are both low, it is preferable to use pressure levels that are sufficient to prevent the design surface from separating from the cavity surface through a compounded effect between these pressure values.

The resin pressure to be applied in the pressure-applying step may be a pressure that would not be sufficient to prevent the design surface of the molded product from separating from the cavity surface, unless the fluid injection step is simultaneously executed. Likewise, the fluid pressure to be applied in the fluid injection step may be a pressure that would not be sufficient to prevent the design surface of the molded product from separating from the cavity surface, unless the pressure-applying step is simultaneously executed. In the pressure-applying step, the present technology can use a pressure that is too low to be able to prevent the design surface of the molded product from separating from the cavity surface unless the fluid injection step is simultaneously executed. Further, it is sufficient to inject a fluid having a pressure that is too low to be able to prevent the design surface of the molded product from separating from the cavity surface unless the pressure-applying step is simultaneously executed. By taking advantage of the characteristics of both steps, it is possible to use low pressure for both of them.

The present technology can also be implemented in an injection molding apparatus. This injection molding apparatus utilizes an injection mold having a gate, a cavity connected with the gate, and a flow channel provided with an opening which opens to the cavity. The opening opens toward the back surface of the molded product. The injection molding apparatus is provided with a pressure-applying device for continuously applying pressure from the gate after the cavity has been filled with the molten resin and a fluid injection device for injecting a fluid from the flow channel.

According to the present injection molding apparatus, even when both the pressure to be applied to the molten resin and the pressure of the fluid to be injected from the flow channel are reduced, the surface shape of the molded product can be formed into the desired shape. Therefore, the pressure resistance required of the injection mold can be reduced. As a result, the injection mold can be reduced in size and the injection molding cost can be lowered.

The injection mold may have a stopper disposed at the opening. The stopper prevents the molten resin from entering through the opening. The stopper being referred to here prevents passage of the molten resin, but allows passage of a fluid having a lower viscosity level. Such a stopper is ordinarily used for degassing a mold, etc.

To injection-mold a molded product having a hole, an injection mold having a columnar area for forming the hole in the molded product is used. When the columnar area is formed inside the cavity, when a molten resin is injected into the cavity from the gate, the molten resin that has passed the right side of the columnar area and the molten resin that has passed the left side of the columnar area merge together on the downstream side of the columnar area. In this case, it is preferable to form the opening of the flow channel in the vicinity of the boundary where the molten resin merges.

At the boundary where two or more resin flows merge, a molding defect called a "weld line" tends to occur. This molding defect tends to occur more frequently if the pressure to be continuously applied to the molten resin after the cavity has been filled with the molten resin is high. This is because the higher the pressure to be continuously applied to the molten resin, the greater the pressure difference between the right and left side of the columnar area. As a result the boundary tends to shift. When the boundary shifts, the weld line tends to occur more easily. To prevent the generation of the weld line, it is effective to lower the pressure to be continuously applied to the molten resin. However, doing so makes the design surface of the molded product more easily separate from the cavity surface. No technology has been available that prevents the generation of the weld line while ensuring the precision of the surface shape. Manufacturers suffer from such problem. The apparatus of the present invention solves this problem.

If the flow channel for the fluid is provided in the vicinity of the boundary where two or more molten resin flows merge, it is possible to lower the pressure to be continuously applied to the molten resin to ensure shape precision of the design surface. As a result, generation of the weld line can be prevented.

Further, it is preferable that the fluid injection device starts to inject the fluid after a tip of the molten resin flowing inside the cavity has passed through the opening of the flow channel.

This injection molding apparatus can allow the molten resin to solidify with the state that the back surface of the molded product being separated from the corresponding cavity surface. The design surface can be finished to the desired shape. Even if bumps are present on the cavity surface facing the back surface of the molded product, it is possible to ensure that no distortion appears on the design surface of the molded product.

Preferred embodiments of the present technology are explained below.

(1) An opening of a flow channel is provided in the terminal areas of an injection mold, where a molten resin cannot easily reach when it is being injected into a cavity of an injection mold from a gate.

(2) The openings of a flow channel are dispersed in positions that correspond to a back surface of a molded product.

(3) A pressurized fluid is injected toward the back surface of the molded product before the pressure of the resin injected into the terminal areas of the cavity is raised by the resin pressure-applying step.

(4) A pressurized fluid is injected toward the back surface of the molded product, after the pressure of the resin injected into the terminal areas of the cavity is raised by the resin pressure-applying step, and the pressure subsequently drops due to cooling.

(5) A pressurized fluid is injected toward the back surface of the molded product, without waiting for the cavity to be filled with the molten resin.

(6) A time at which the molten resin that has been injected into the cavity passes through the opening of the flow channel is measured beforehand, and the injection of the pressurized fluid is started when that timing has passed.

(7) The pressurized fluid is pressurized air.
(8) Air from an air supply already provided within a factory is used as the pressurized air. No new equipment is needed.

Embodiment 1

Figure 2:
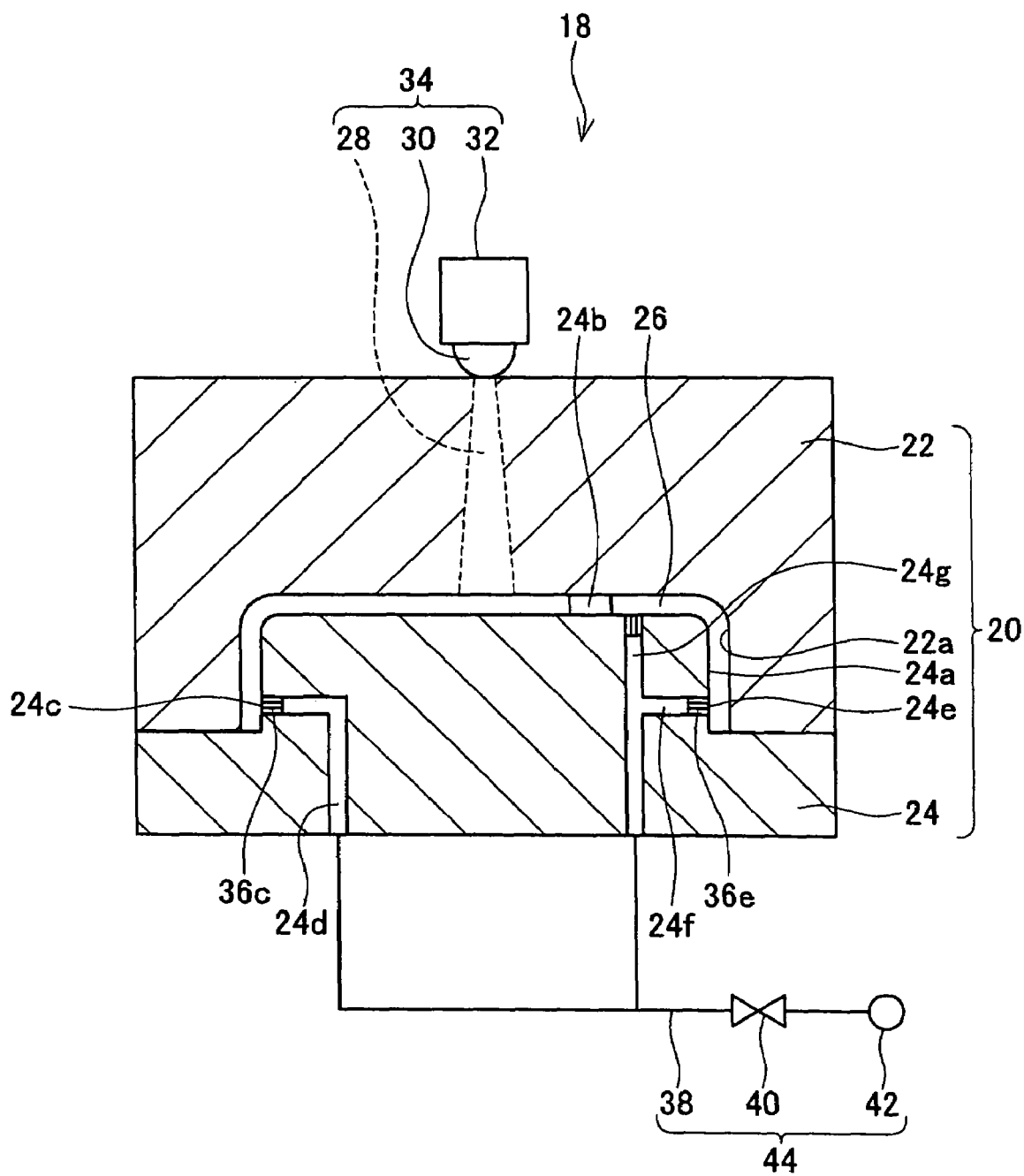
FIG. 2 is a schematic cross-sectional diagram of an injection molding apparatus of a first embodiment.
Figure 3:
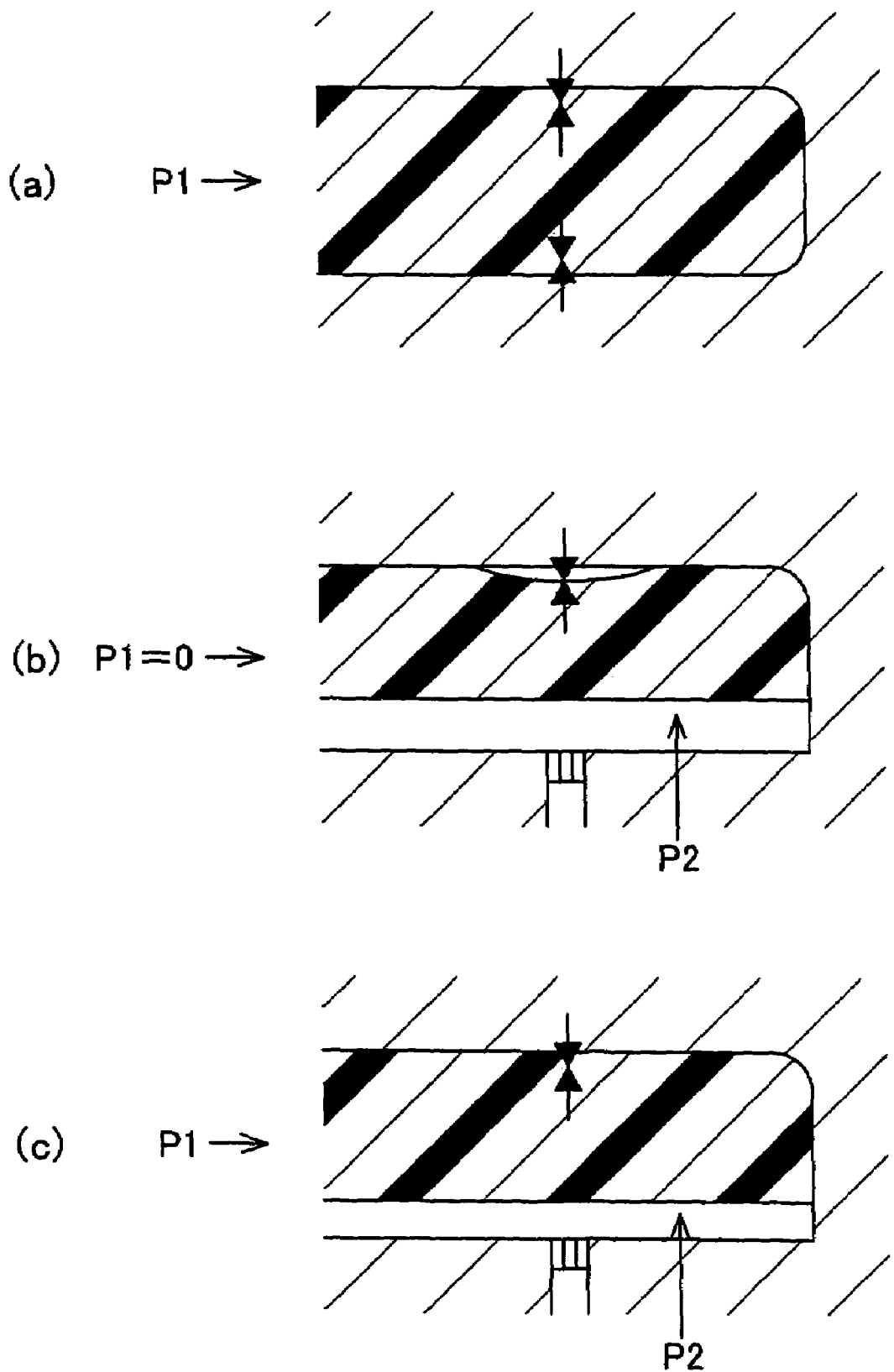
FIG. 3 is a diagram that explains how the top surface of a molded product separates from the cavity surface.
Figure 4:
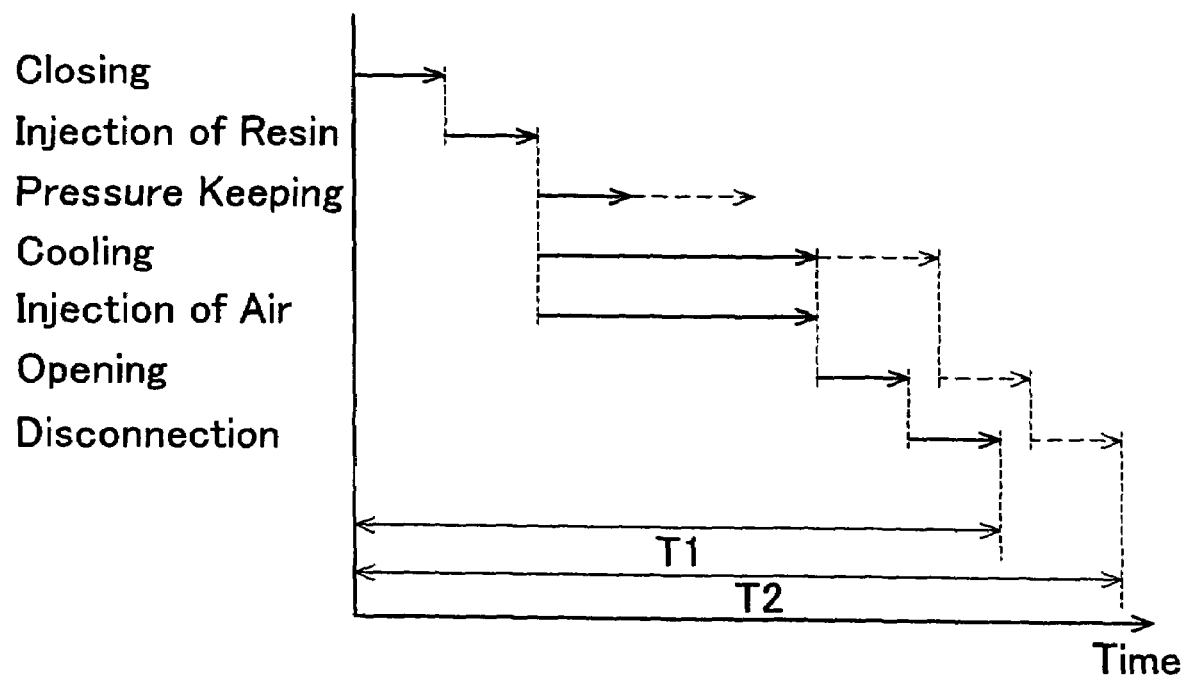
FIG. 4 is a diagram that explains a process diagram of the first embodiment in comparison with a conventional example.

Embodiment 1 is explained below, referencing to the drawings. FIG. 1 is a perspective diagram of a molded product that is formed using the injection molding technology of the present embodiment. FIG. 2 is a schematic cross-sectional diagram of the injection molding apparatus of the present embodiment. FIG. 3 is a diagram that compares the injection molding method of the present embodiment with a conventional injection molding method. FIG. 4 is a process diagram for the injection molding method of the present embodiment. FIG. 5 is a diagram that illustrates the pressure necessary in the injection molding method of the present embodiment in comparison with that in a conventional example.

The molded product 10 illustrated in FIG. 1 is a molded resin product that is injection-molded by the injection molding apparatus 18 illustrated in FIG. 2. A typical example is a molded resin bumper for an automobile.

In the molded product 10, one surface 12 is a design surface (front surface) that must be precisely finished to the desired surface shape, and one surface 14 is a back surface whose surface shape is not critical. A through-hole 16, which goes through from front to back, is formed in the molded product 10.

FIG. 2 illustrates a cross section of a mold 20 of the injection molding apparatus 18 at the position corresponding to line II-II in the molded product in FIG. 1. The mold 20 comprises a female mold 22 for molding the design surface 12 of the molded product 10 and a male mold 24 for molding the back surface 14 of the molded product 10. The shape of a cavity 26, which is formed by combining the female mold 22 and the male mold 24, corresponds to the shape of the molded product 10 to be obtained. That is, the cavity surface 22a of the female mold 22 corresponds exactly to the design surface 12 of the molded product 10. The cavity surface 24a of the male mold 24 approximately matches the back surface 14 of the molded product 10. A columnar area 24b extending from cavity surface 24a to cavity surface 22a is formed in the male mold 24. The shape of the columnar area 24b corresponds to the shape of the through-hole 16 to be formed in the molded product 10.

A gate 28, which connects the outside of the female mold 22 to the cavity surface 24a, is formed in the female mold 22. A nozzle 30 of a runner 32 is installed at the location where the gate 28 opens to the outside of the female mold 22. The gate 28 and the runner 32 constitute a resin injector 34. The runner 32 pushes out a molten resin at a predetermined pressure. The runner injects the molten resin into the cavity 26 from the gate 28. Two fluid injection flow channels 24d and 24f are formed in the male mold 24. The fluid injection flow channels 24d and 24f connect the outside of the male mold 24 to the cavity surface 24a. The fluid injection flow channels 24d and 24f open to the cavity surface 24a, and their openings 24c and 24e are provided in the terminal areas where the molten resin cannot easily reach when it is being injected into the cavity 26 from the gate 28. The openings 24c and 24e are provided with vents 36c and 36e. Vents 36c and 36e have small holes with diameters that do not allow the molten resin to pass but do allow air to pass through.

Furthermore, a third fluid injection flow channel 24g is provided. The opening of the fluid injection flow channel 24g is formed at a position where the molten resin that has passed the right side of the columnar area 24b and the molten resin that has passed the left side of the columnar area 24b merge together on the downstream side of the columnar area 24b. The columnar area 24b is used for forming the through-hole 16. The opening of the fluid injection flow channel 24g is also provided with a vent.

A fluid tube 38 is connected to the locations where the fluid injection flow channels 24d, 24f, and 24g open to the outside of the male mold 24. One end of the fluid tube 38 is connected to a pump 42. The pump 42 pressurizes and sends out a fluid. A valve 40 for adjusting the flow rate and pressure of the fluid is provided in the middle of the fluid tube 38. The valve 40 regulates the pressure of the air supplied by the pump 42 to 0.5 MPa. A controller not shown in the figure controls the degree of opening of the valve 40. The pressurized fluid (air in this embodiment) being sent out by the pump 42 is regulated by the valve 40 to 0.5 MPa. The pressurized fluid is injected into the cavity 26 via the fluid tube 38 and the fluid injection flow channels 24d, 24f, and 24g. The openings of the fluid injection flow channels 24d, 24f, and 24g are provided on the side of the male mold 24 and send out the pressurized air that has been regulated to 0.5 MPa toward the back surface of the molded product.

Further, a lot of grooves which extend in a radial pattern from the opening of the fluid injection flow channels 24d may be formed on the surface of the male mold 24. Likewise, grooves which extend in a radial pattern from the opening of the fluid injection flow channels 24f and 24g may be formed. The grooves promote the pressurized air into a wide area of the back surface 14 of the molded product 10. This causes the back surface 14 of the molded product 10 to be separated from the male mold 24 quickly.

Instead of forming the grooves, a molding lubricant may be used. The molding lubricant may be applied to the surface of the male mold 24. The back surface 14 of the molded product 10 can be separated from the male mold 24 easily. If a molding lubricant is also used for the female mold 22, it is preferred that the molding lubricant for the male mold 24 is different from the molding lubricant for the female mold 22. A molding lubricant that can separate the molded product 10 from the male mold 24 earlier than the female mold 22 is used as the molding lubricant for male mold 24.

As described above, it is preferred to adopt a means for separating the back surface 14 of the molded product 10 from the male mold 24 easily. In addition to above examples, a following means may be adopted. That is, the male mold 24 may be constituted by a low thermal conductivity material, and the female mold 22 may be constituted by a high thermal conductivity material. This also realizes that the back surface 14 of the molded product 10 is separated from the male mold 24 earlier than separated from the female mold 22.

The process diagram of the injection molding method based on the aforementioned injection molding apparatus 18 will now be explained, referencing FIG. 4.

First, the female mold 22 and the male mold 24 are combined to close the mold 20. At this time, the valve 40 in the fluid injector 44 is kept closed. From this state, a molten resin is pushed out from the runner 32 of the mold injector 34 at an injection pressure of approximately 50 MPa. The molten resin that is pushed out is injected into the cavity 26 via the nozzle 30 and from the gate 28. In the vicinity of the columnar area 24b, the molten resin passes the right and left sides of the columnar area 24b and merges together on the downstream side of the columnar area 24b.

When the cavity 26 has been filled with the molten resin, the injection pressure of the runner 32 is lowered to 20 MPa, and the process shifts to the molten resin pressure-keeping step.

When the filling of the cavity 26 with the molten resin is finished, that is, when the pressure-keeping step is started, the valve 40 of the fluid injector 44 is opened. The air that has been pressurized to 0.5 MPa is sent out to the fluid injection flow channels 24d, 24f, and 24g.

The relationship between the pressure being applied to the molten resin inside the cavity 26 from the gate 28 and the pressure of the pressurized fluid being applied to the fluid injection flow channels 24d, 24f, and 24g produces the phenomenon described below.

The pressure of the molten resin inside the cavity 26 is higher than the pressure of the pressurized fluid when the pressurized fluid injection step starts. The resin pressure declines as the molten resin solidifies, and when the resin pressure falls below the fluid pressure, the pressurized fluid is injected onto the back surface side 14 of the molded product 10.

Since the pressurized fluid is injected onto the back surface 14 of the molded product 10 from the fluid injection flow channels 24d, 24f, and 24g, the design surface 12 of the molded product 10 does not separate from the cavity surface 22a.

The molten resin that has been injected into the cavity 26 is cooled and shrinks. During this process, the pressurized fluid is injected onto the back surface 14 of the molded product 10. At the same time, pressure of approximately 20 MPa is continuously applied from the runner 32. As shown in FIG. 5, when pressure of approximately 20 MPa is continuously applied from the runner 32, the resin pressure in the terminal areas becomes approximately 8 MPa.

This resin pressure is approximately half that required in the conventional resin pressure-keeping technology indicated as the conventional example 1 in FIG. 5. This resin pressure in this embodiment is low.

FIG. 3 is a diagram that compares the injection molding technology of the present embodiment with a conventional injection molding technology. FIG. 3 (a) corresponds to a technology that prevents the design surface of the molded product from separating from the cavity surface merely by continuously applying pressure P1 from the gate 28. This technology does not guarantee that the back surface of the molded product will separate from the cavity surface first, and the design surface of the molded product could not separate from the cavity surface first. In such a case, the compounded force resulting from shrinking of the molded product on both its design and back sides becomes the force that separates the design surface of the molded product from the cavity surface. To counteract this force and prevent the design surface of the molded product from separating from the cavity surface, it is necessary to increase the pressure P1, which is to be continuously applied to the molten resin from the gate 28. As shown in FIG. 5, a high replenishing pressure that can produce a pressure of around 40 MPa at the gate area (16 MPa at the terminal areas) is required.

FIG. 3 (b) corresponds to a technology that prevents the design surface of the molded product from separating from the cavity surface merely by injecting a pressurized fluid toward the back surface of the molded product. With this technology, it is necessary to push the molded product from the back surface against the front surface with a fairly large pressure. As shown in FIG. 5, it is necessary to push the molded product from the back surface against the design surface with a pressure of around 18 MPa.

FIG. 3 (c) corresponds to the present embodiment and continues to apply the pressure P1 to the molten resin and at the same time injects pressurized air toward the back surface 14 of the molded product 10. Even when the air injection pressure is low, it is guaranteed that the back surface of the molded product will separate from the cavity surface 24a before the design surface of the molded product separates from the cavity surface 22a. The pressure P1 to be applied to the molten resin can be reduced. As shown in FIG. 5, only a pressure of around 20 MPa at the gate area (8 MPa at the terminal areas) is required.

These numerical values are presented only as examples and should not be taken as limiting the technical scope of the invention. Furthermore, the above explanation is presented for explaining the presumed reason. The technology of the present invention is not restricted by this presumed reason. Strictly speaking, the technology of the present invention is a technology that simultaneously executes a step that continuously applies pressure to the molten resin from the gate 28 and a step that injects a pressurized fluid from a flow channel 24d, 24f, 24g.

The molten resin pressure-keeping step may be terminated before the pressurized fluid injection step. In the present embodiment, implementing the pressurized fluid injection step reduces the force that tries to cause the design surface 12 of the molded product 10 to separate from the cavity surface 22a. Even if the resin pressure-keeping step is terminated at a stage when the strength of the design surface 12 of the molded product 10 is relatively low, it is possible to prevent the design surface 12 of the molded product 10 from separating from the cavity surface 22a. Therefore, the resin pressure-keeping time can be significantly shortened.

Since the resin pressure-keeping time can be significantly shortened, the subsequent steps can be executed earlier. In FIG. 4, the dotted lines indicate the process execution timings based on the conventional technique. The present embodiment can accelerate the timing for opening the mold and can thus accelerate the timing for disconnecting the product. As a result, the cycle time is shortened and mass production efficiency is improved.

The present embodiment can nearly halve the pressure necessary in the molten resin pressure-keeping step. Therefore, the boundary, where the molten resin that has passed the right side of the columnar area 24b and the molten resin that has passed the left side of the columnar area 24b merge together on the downstream side of the columnar area 24b, does not shift during the resin pressure-keeping step. It is possible to mold a product on which a resin merging boundary (weld line) is not very visible. For achieving this effect, it is preferable to form the fluid injection flow channel 24g in the vicinity of the merging boundary.

Furthermore, it is also possible to simultaneously execute the step of continuously applying pressure to the molten resin from the gate 28 and a step of mechanically separating the back surface 14 of the molded product 10 from the cavity surface 24a. These steps are executed after the cavity 26 of the injection mold 20 has been filled with the molten resin but before the mold 20 is opened. A knock-out pin or the like can be used to separate the back surface 14 of the molded product 10 from the cavity surface 24a before the design surface 12 of the molded product 10 separates from the cavity surface 22a.

Embodiment 2

Figure 6:
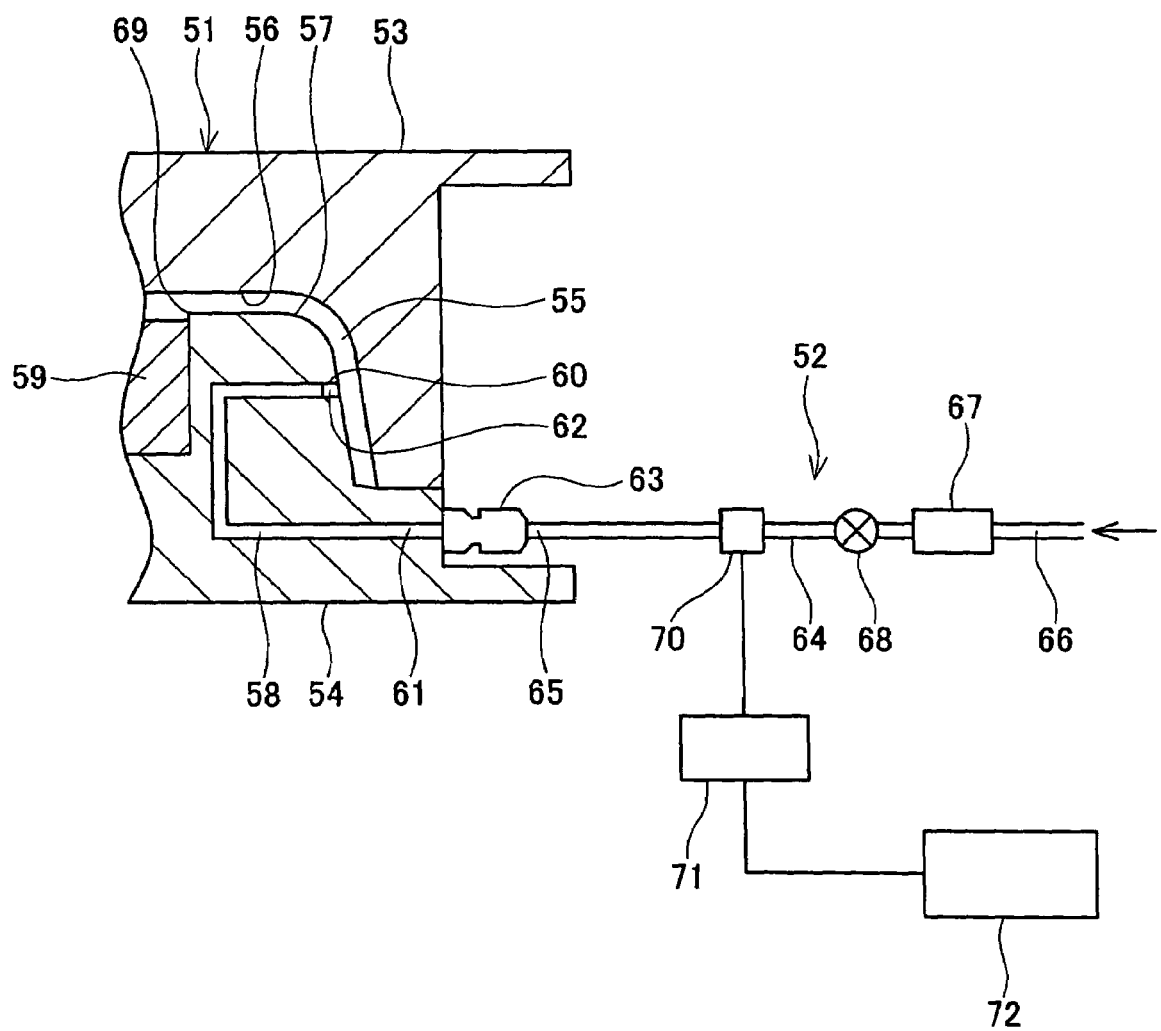
FIG. 6 is a schematic cross-sectional diagram of the injection molding apparatus of the second embodiment.

Embodiment 2 is explained below, referencing the drawings. In Embodiment 2, an injection molding apparatus 50 illustrated in FIG. 6 is used to mold the molded product 10 having the same shape as in Embodiment 1 (see FIG. 1). The injection molding apparatus 50 comprises a mold 51 and a pressurizer 52. FIG. 6 shows only the part of the mold 51 that molds a terminal area of the molded product 10. The mold 51 comprises a female mold 53 and a male mold 54. The male mold 54 has a core 59. A cavity 55 is formed by combining the female mold 53 and the male mold 54. The cavity surface 56 of the female mold 53 corresponds to the design surface 12 of the molded product 10. The cavity surface 57 of the male mold 54 approximately matches the back surface 14 of the molded product 10. To open the mold 51, the female mold 53 and the male mold 54 are pulled apart vertically.

A fluid injection flow channel 58 is formed in the male mold 54. One end of the fluid injection flow channel 58 opens to the cavity surface 57 at an opening 60. The other end 61 of the fluid injection flow channel 58 opens to the outside of the male mold 54. The opening 60 is provided with a vent 62. The vent has holes for linking the cavity 55 with the fluid injection flow channel 58. The size of this linking hole is set such that no resin will flow into the fluid injection flow channel 58 when a molten resin is injected into the cavity 55.

Although not shown in FIG. 6, the injection molding apparatus 50 of Embodiment 2, like the injection molding apparatus 18 of Embodiment 1, has a resin injector 34 comprising a runner 32, a nozzle 30, and a gate 28.

The pressurizer 52 is provided with an autocoupler 63, a fluid tube 64, a solenoid valve 70, a regulator 68, a filter 67, a timer 71, and a molding controller 72. The autocoupler 63 is secured to the outside of the male mold 54. The autocoupler 63 is connected to the fluid injection flow channel 58. One end 65 of the fluid tube 64 is connected to the autocoupler 63. Factory air is supplied as a pressurized fluid to the other end 66 of the fluid tube 64. The filter 67, the regulator 68, and the solenoid valve 70 are connected to the fluid tube 64. The filter 67 removes foreign substances contained in the factory air. The regulator 68 regulates the supplied factory air to the predetermined pressure (e.g., 0.5 MPa). The solenoid valve 70 opens and closes the fluid tube 64. When the solenoid valve 70 is open, a pressurized fluid whose pressure has been regulated by the regulator 68 is supplied to the fluid injection flow channel 58 of the mold 51. The solenoid valve 70 is connected to the timer 71, which is in turn connected to the molding controller 72. The molding controller 72 comprehensively controls the injection molding apparatus 50.

The molding controller 72 outputs an injection start signal to the timer 71 when injection of a molten resin into the mold 51 is started. Further, the molding controller 72 outputs a mold-opening signal to the timer 71 when an action to open the mold 51 is started. Further, the molding controller 72 outputs a mold-closing signal to the timer 71 when an action to close the mold 51 is started.

Based on the injection start signal, mold-opening signal, and mold-closing signal that have been input, the timer 71 outputs an opening signal or closing signal to the solenoid valve 70. The timing at which the timer 71 outputs the opening/closing signal is described in detail later.

Figure 7:
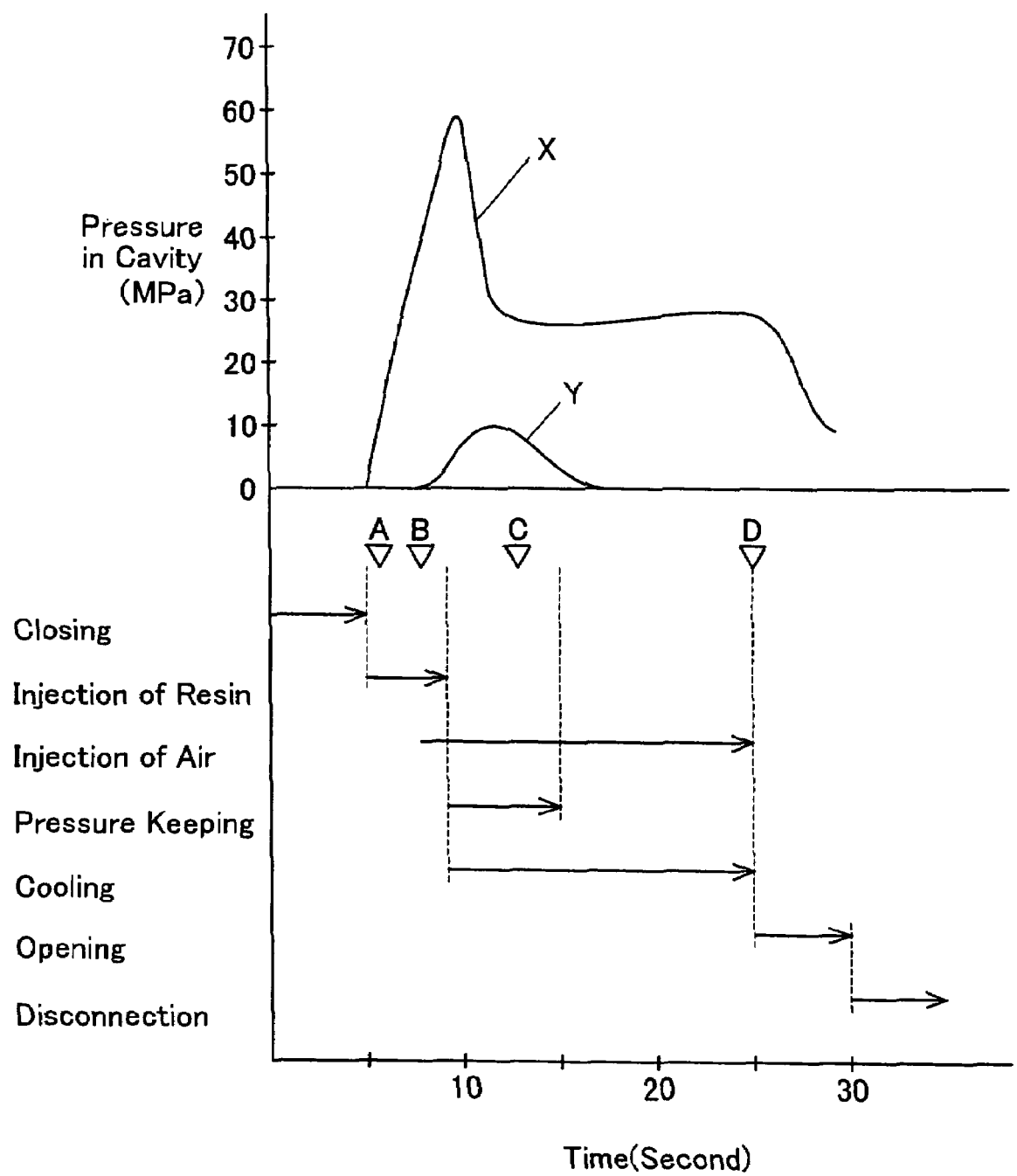
FIG. 7 is a diagram that explains the various steps in injection molding and the changes in the pressure inside the cavity.

The step of molding the molded product 10 by means of the injection molding apparatus 50 is explained below, referencing to FIG. 7. The changes in the pressure inside the cavity 55 are also explained below. The bottom half of FIG. 7 is a molding process diagram. The top half of FIG. 7 is a graph showing the pressure inside the cavity 55. The horizontal axis of the molding process diagram indicates time (seconds). The time on this horizontal axis is also applicable to the graph showing the pressure inside the cavity 55. Curve X shown inside the graph showing the pressure inside the cavity 55 corresponds to the intra-cavity pressure near the gate 28 (see FIGS. 1 and 2). The triangles assigned letters A through D in FIG. 7 will be used later in the detailed explanation on the timing for starting or stopping the injection of a pressurized fluid.

As shown in FIG. 7, to mold the molded product 10, a step of closing the mold 51 by combining the female mold 53 and the male mold 54 is first carried out. When the mold-closing step is started, the mold-closing signal is output to the solenoid valve 70. As a result, the solenoid valve 70 is closed. Therefore, no pressurized air is supplied to the fluid injection flow channel 58 of the mold 51. Next, a step of injecting a molten resin from the gate 28 into the cavity 55 is carried out.

The injected molten resin begins to fill the cavity 55. The intra-cavity pressure (curve X) near the gate 28 rises rapidly to around 60 (MPa) when the injection starts. Even when the molten resin is injected into the cavity 55, its pressure is not immediately propagated to the vicinity of the opening 60 of the fluid injection flow channel 58. Therefore, it is near the end of the injection step when the pressure (curve Y) in the vicinity of the opening 60 begins to rise.

Figure 8:
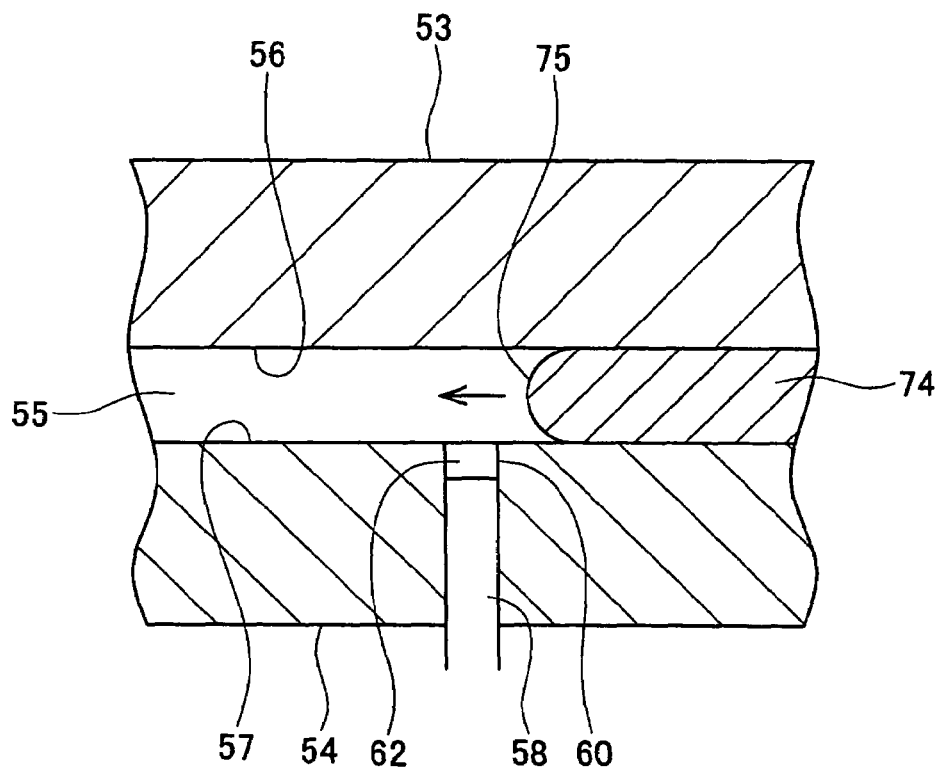
FIG. 8 is a diagram that explains how the resin flows inside the cavity.
Figure 9:
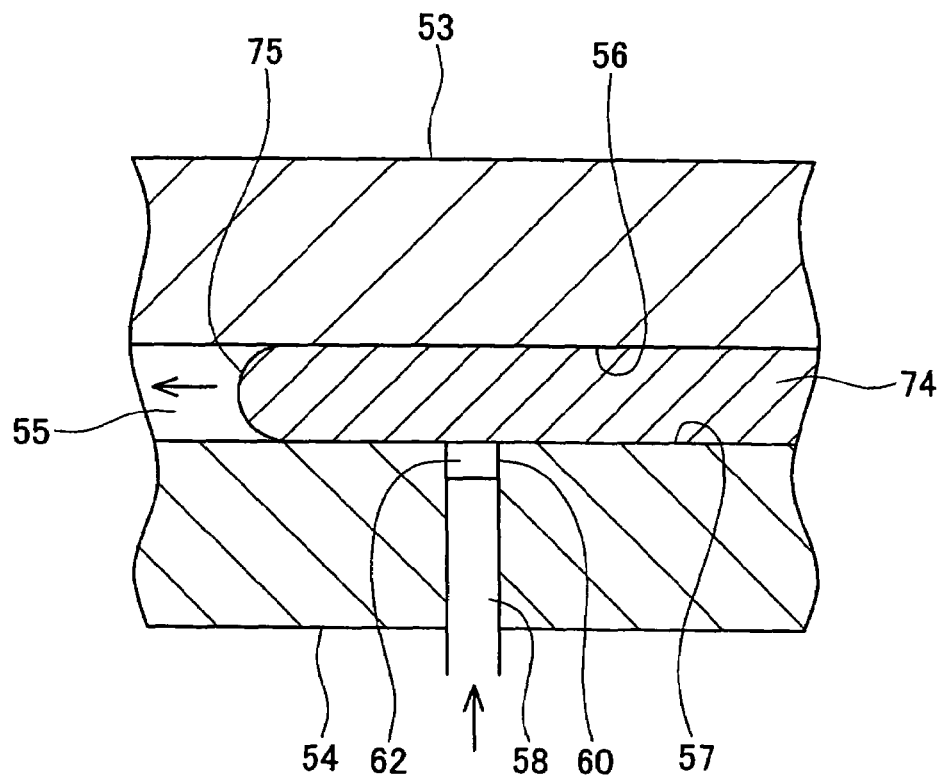
FIG. 9 is a diagram that explains how the resin flows inside the cavity.

The injected molten resin flows inside the cavity 55. FIG. 8 illustrates the state before the tip (leading edge) 75 of the molten resin 74 injected into the cavity 55 passes through the opening 60 of the fluid injection flow channel 58. Hereinafter, the tip 75 of the molten resin 74 is referred as the "melt front 75". FIG. 9 illustrates the state immediately after the melt front 75 of the molten resin 74 has passed through the opening 60 of the fluid injection flow channel 58.

The timer 71 counts the time elapsed since the mold-closing signal was input from the molding controller 72. Then, the timer 71 outputs an opening signal to the solenoid valve 70 when the melt front 75 of the resin 74 has passed through the opening 60 of the fluid injection flow channel 58. This timing is indicated by triangle B in FIG. 7, and hereafter referred to as the "injection timing". The injection timing has been predetermined by estimating the timing at which the melt front 75 passes through the opening 60 using the measurement data on the pressure on the cavity surface 57 near the opening 60 and the results of fluid dynamics analysis inside the cavity 55 of the resin 74, etc. It is also possible to begin counting time when the injection start signal is input, and output the opening signal to the solenoid valve 70 based on this counted time.

When the solenoid valve 70 opens at the injection timing, a pressurized fluid in the form of air is supplied to the fluid injection flow channel 58 and the fluid injection step begins. At this time, the resin 74 near the opening 60 has not solidified. The air is injected from the vent 62 toward the back surface of the resin 74, which has not solidified. This step causes the back surface of the resin 74 to separate from the cavity surface 57.

Although only one is shown in FIG. 6, multiple openings for injecting a fluid into the cavity 55 are actually provided on the cavity surface 57. The timing at which a fluid is injected into each opening is individually adjusted by a solenoid valve. This solenoid valve is installed in the fluid tube linked to each opening and is controlled by the timer 71.

As shown in FIG. 7, after the molten resin injection step is finished, the step shifts to the molten resin pressure-keeping step ("pressure-keeping step"). A cooling step is also started along with the pressure-keeping step, and the falling temperature inside the cavity 55 promotes the solidification of the resin 74. As a result of the fluid injected from the vent 62, the resin 74 solidifies while the back surface of the resin 74 is being separated from the cavity surface 57. Even after the pressure-keeping step is finished, the fluid injection step (injection of air) and the cooling step are continued, and these two steps are subsequently terminated simultaneously.

The intra-cavity pressure near the gate 28 (curve X) falls rapidly when the process shifts to the pressure-keeping step. The intra-cavity pressure near the gate 28 is maintained at approximately 35 (MPa) until the cooling step is finished. The intra-cavity pressure near the opening 60 (curve Y) continues to rise even after the pressure-keeping step is started, peaks (at approximately 10 (MPa)) in the middle of the pressure-keeping step, and then falls. The intra-cavity pressure near the opening 60 is returned to zero after the pressure-keeping step is finished. In this way, the intra-cavity pressure near the opening 60 exceeds the pressure (0.5 (MPa)) of the pressurized fluid one time. However, even though the intra-cavity pressure near the opening 60 exceeds the pressure (0.5 (MPa)) of the pressurized fluid, the back surface of the resin 74 soon separates from the cavity surface 57 because the resin 74 shrinks through cooling and the pressure of the resin becomes lower than the pressure of the pressurized fluid.

Figure 10:
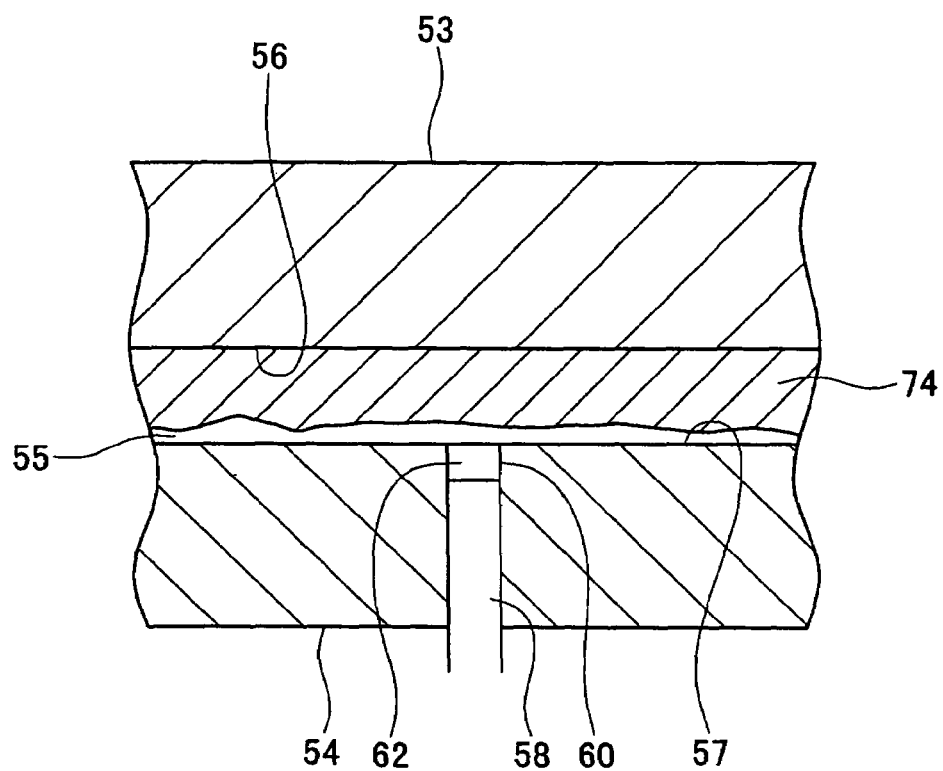
FIG. 10 is a diagram that explains the state of the resin inside the cavity when the fluid injection step is finished.

FIG. 10 illustrates the state of the resin 74 when the fluid injection step is finished (indicated by triangle D in FIG. 7). The back surface of the resin 74 has separated, but the front surface of the resin securely contacts the cavity surface 56 of the female mold 53. As shown in FIG. 6, even when a step 69 exists between the core 59 and the male mold 54, since solidification proceeds with the back surface of the resin 74 being separated from the step 69, no bumped area is formed on the back surface of the resin 74 by the step 69. Since no bumped area is formed on the back surface of the resin 74, the design surface 12 is not affected at all (i.e., distortion corresponding to a bumped area does not occur on the design surface 12). Therefore, the design surface 12 of the molded product 10 is molded properly.

Figure 14:
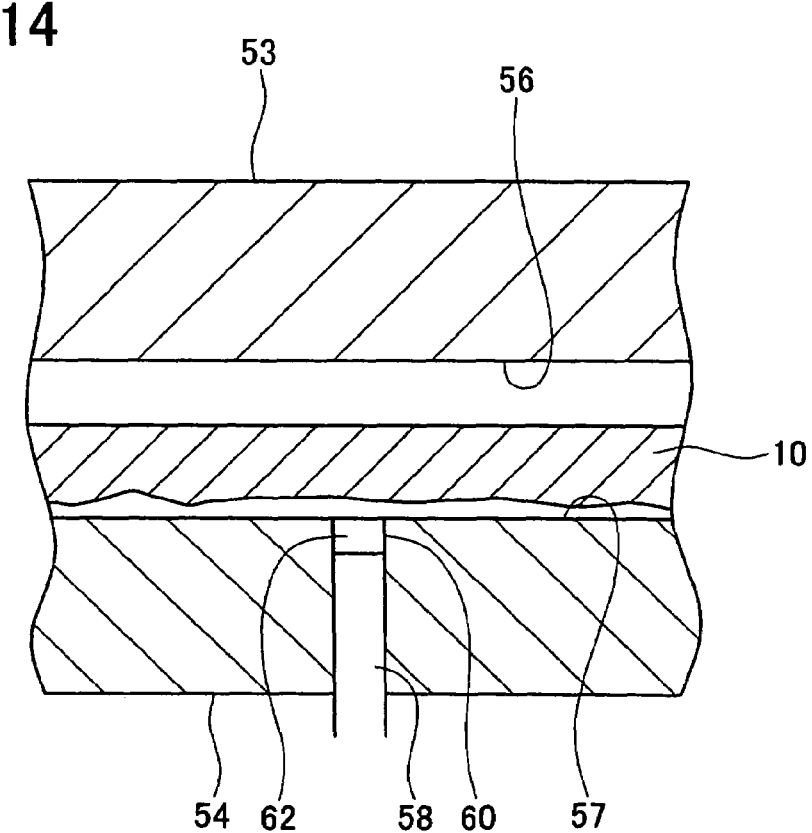
FIG. 14 is a diagram that explains the state in which the molded product has been formed.

When the fluid injection step and the cooling step are finished, the timer 71 outputs a closing signal to the solenoid valve 70. When the solenoid valve 70 closes, the supply of pressurized fluid to the cavity 55 is stopped. After the fluid injection step and the cooling step are finished, the process shifts to the mold-opening step to open the mold 51. FIG. 14 illustrates the state in which the mold 51 has been opened.

Lastly, a product-disconnection step is executed to disconnect (remove) the molded product 10 from the mold 51.

Figure 11:
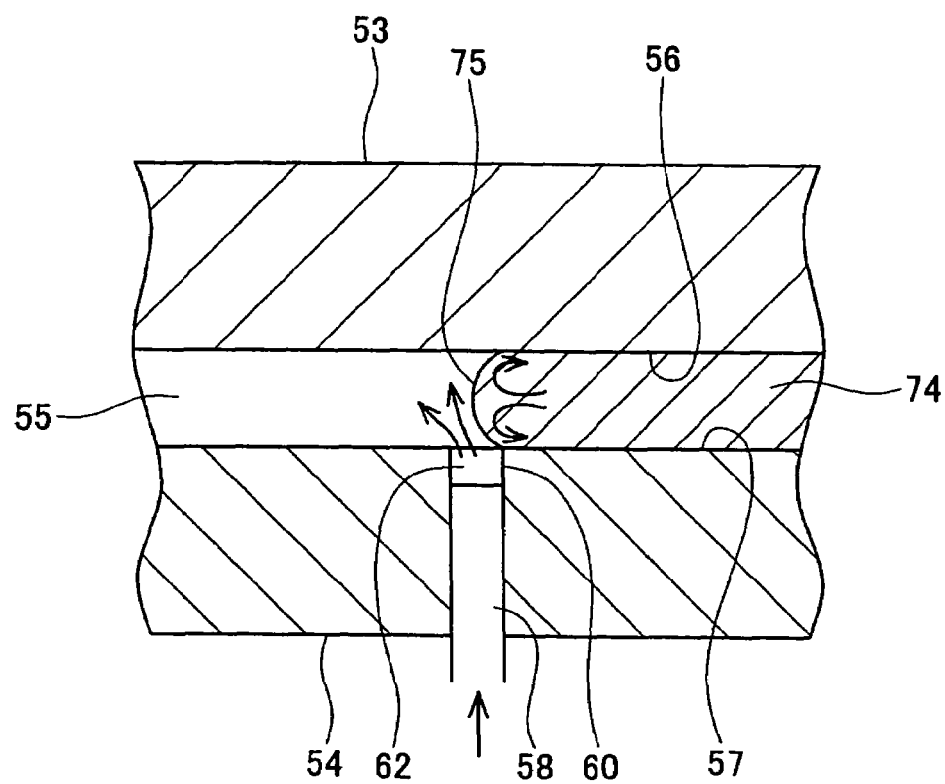
FIG. 11 is a diagram that explains how the resin flows inside the cavity.

As explained above, by injecting the fluid toward the back side of the resin 74 immediately after the melt front 75 of the resin 74 has passed through the opening 60 (at the injection timing), it is possible to mold a molded product 10 having an excellent design surface 12. In contrast, if a fluid is injected into the cavity 55 before the melt front 75 of the resin 74 has passed through the opening 60 (indicated by triangle A in FIG. 7), the fluid is blown into the melt front 75 as shown in FIG. 11. Consequently, flow marks are generated on the molded product 10.

Figure 12:
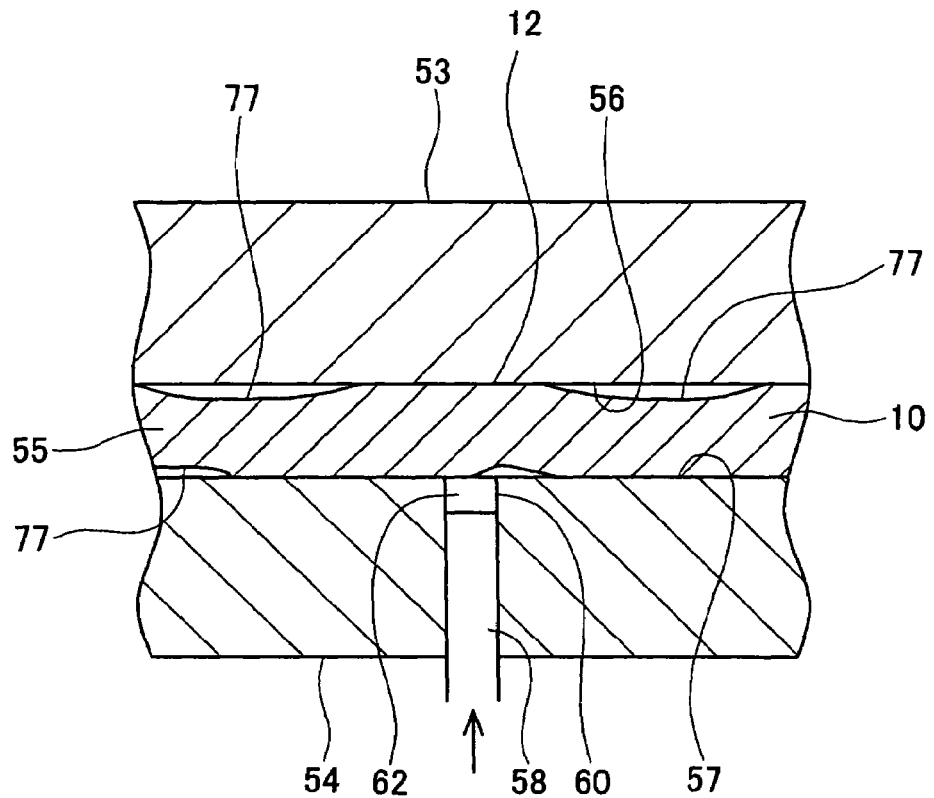
FIG. 12 is a diagram that explains the state in which the molded product has been formed.
Figure 13:
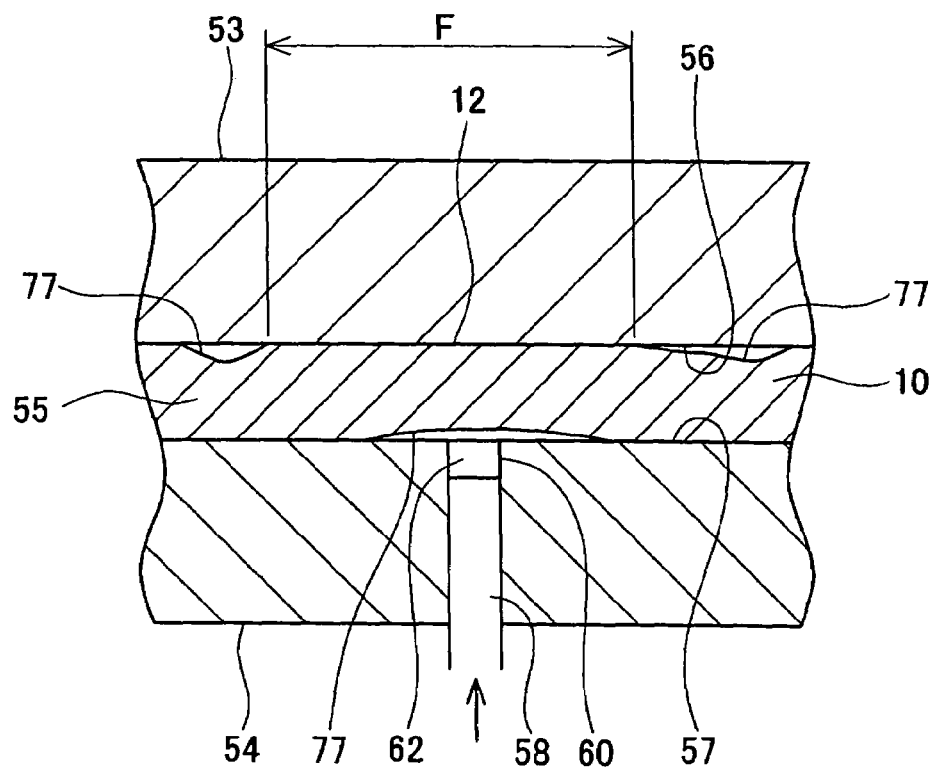
FIG. 13 is a diagram that explains the state in which the molded product has been formed.

As the cooling step proceeds, the resin 74 that has been injected into the cavity 55 shrinks during the solidification process. Injecting the fluid toward the back surface of the resin 74 after the cooling step has begun (triangle C in FIG. 7) causes the design surface 12 of the molded product 10 to deform. That is, injecting the fluid after the resin 74 has begun to shrink causes the design surface 12 to deform. Specifically, as shown in FIG. 12, deformations 77 on the design surface 12 and back surface 14 of the molded product 10 are caused if shrinking occurs before the fluid has sufficiently entered the back surface side of the resin 74. Even if the injection of the fluid is started immediately after the melt front 75 of the resin 74 has passed through the opening 60 (i.e., at the injection timing, indicated by triangle B in FIG. 7), if the fluid injection is stopped early (e.g., triangle C in FIG. 7) while the resin 74 is still in the process of solidifying, the molded product 10 will not form properly. More specifically, as shown in FIG. 13, the range F that the design surface 12 of the molded product 10 can be properly molded (the range that the fluid injection is effective) becomes narrow.

Figure 15:
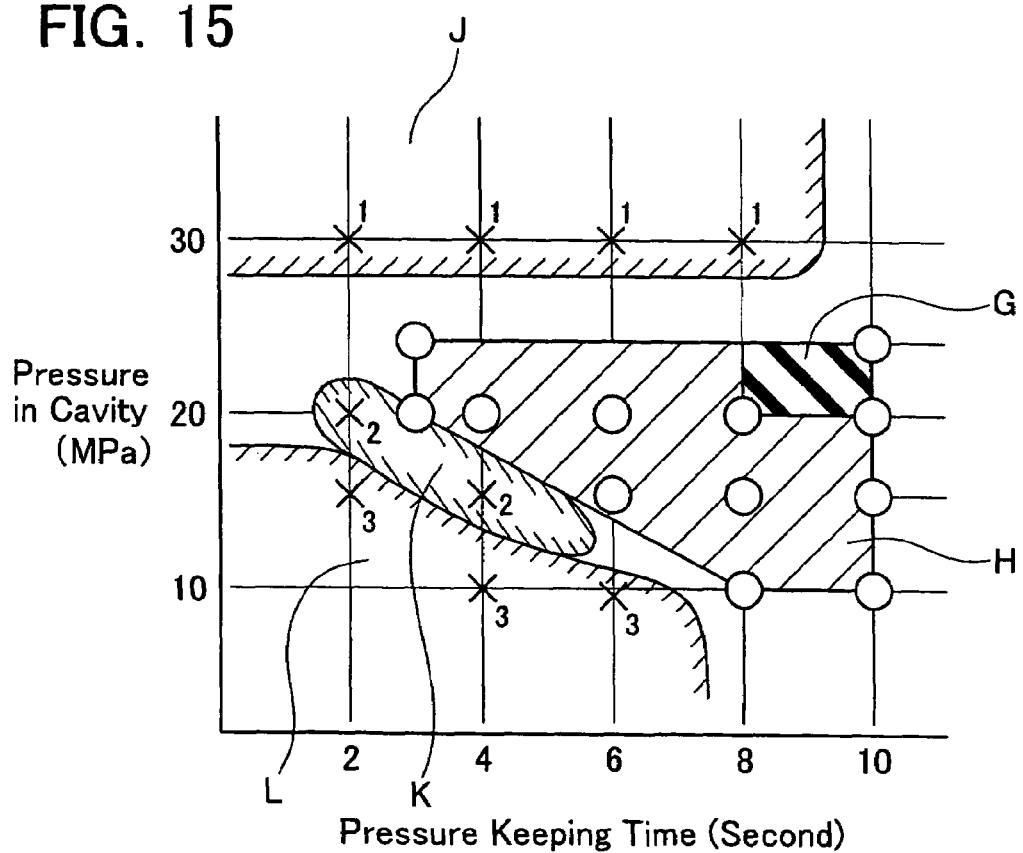
FIG. 15 is a diagram that explains the results of injection molding when a pressure-keeping time and pressure inside the cavity are varied.

The inventor has tried molding the molded product 10 while varying the pressure-keeping time and the pressure inside the cavity 55, with the fluid being injected toward the back side of the resin 74. FIG. 15 shows the results. The horizontal axis in FIG. 15 corresponds to the pressure-keeping time. The vertical axis corresponds to the pressure (MPa) inside the terminal area (vicinity of the opening 60) of the cavity 55. Note that this intra-cavity pressure was measured in the pressure-keeping state.

In FIG. 15, ○ indicates a point at which the molded product 10 was molded properly. The X mark with "1" indicates a point at which burrs occurred on the molded product 10. The X mark with "2" indicates a point at which voids occurred in the molded product 10. The X mark with "3" indicates a point at which distortion occurred in the molded product 10. In other words, the molded product 10 cannot be properly formed in regions J, K, or L.

In contrast, it is possible to properly mold the molded product 10 if the pressure-keeping time and the intra-cavity pressure are combined in region G indicated with thick hatching lines and region H indicated with thin hatching lines.

When no fluid is injected to the back surface of the resin 74, as in the conventional example, the molded product 10 can be properly molded only in region G. That is, with the conventional technology, a minimum of 8 (seconds) is required as the pressure-keeping time. In contrast, the technology of the present invention can properly mold the molded product 10 even when the pressure-keeping time is shortened to 3 (seconds). Since a shorter pressure-keeping time shortens the molding time, a greater number of products can be molded per unit time. Further, whereas the conventional technology requires an intra-cavity pressure of at least 20 (MPa), the technology of the present invention can properly mold the molded product 10 even when said pressure is reduced to 10 (MPa). Since the intra-cavity pressure can be reduced, it becomes possible to mold larger molded products even if the mold-tightening pressure is not increased.

The aforementioned numerical values are presented only as examples and should not be taken as limiting the technical scope of the invention. Furthermore, the above explanation is presented for explaining the presumed reason, and the technology of the present invention is not restricted by this presumed reason.

The technical elements explained in this Specification or with respect to the drawings produce technical usefulness alone or in various combinations, and are not limited to the combinations described in the claims when the patent application was submitted. Furthermore, the technologies presented as examples in this Specification or in the drawings simultaneously achieve multiple objectives, and produce technical usefulness even by achieving only one of these objectives.

The invention claimed is:

1. An injection molding method using an injection mold, the injection mold comprising a gate, a cavity connected with the gate, and a flow channel having an opening which opens toward a back surface of a molded product, the method comprising:
   a molten resin injection step of injecting molten resin from the gate into the cavity;
   a pressure keeping step of applying pressure from the gate against the injected resin within the cavity after the molten resin injection step; and
   a pressurized fluid injection step of injecting a pressurized fluid via the flow channel, the pressurized fluid injection step being started during the molten resin injection step, wherein the pressure keeping step and the pressurized fluid injection step are simultaneously executed, the pressure applied in the pressure keeping step is lower than injection pressure applied in the molten resin injection step, fluid pressure applied in the pressurized fluid injection step is lower than the pressure applied in the pressure keeping step, the pressure applied in the pressure keeping step is pressure that would not be sufficient to prevent a design surface of the molded product from separating from a surface of the cavity unless the pressurized fluid injection step is simultaneously executed, and the fluid pressure applied in the pressurized fluid injection step is pressure that would not be sufficient to prevent the design surface of the molded product from separating from the surface of the cavity unless the pressure keeping step is simultaneously executed.

2. The method as in claim 1, wherein the pressurized fluid injection step is started after a tip of the molten resin flowing inside the cavity has passed through the opening of the flow channel.

3. The method as in claim 1, wherein the pressurized fluid injection step is continued after the pressure keeping step has been finished.

4. The method as in claim 1, wherein pressure of the injected resin within the cavity is higher than the fluid pressure applied in the pressurized fluid injection step when the pressurized fluid injection step is started.

5. The method as in claim 4, wherein the pressurized fluid injection step is started between a timing in which a tip of the molten resin flowing inside the cavity passes through the opening of the flow channel and a timing in which the pressure keeping step is started.

6. An injection molding apparatus, comprising:

an injection mold comprising a gate, a cavity connected with the gate, and a flow channel having an opening which opens toward a back surface of a molded product, wherein the injection mold further comprises a columnar area for forming a hole in the molded product;

a molten resin injection device for injecting molten resin from the gate into the cavity, wherein the opening of the flow channel is formed in a vicinity of a boundary where the molten resin that has passed a right side of the columnar area and the molten resin that has passed a left side of the columnar area merge together;

a pressure keeping device for applying pressure from the gate against the injected resin within the cavity after the cavity has been filled with the molten resin; and a pressurized fluid injection device for injecting a pressurized fluid toward the back surface of the molded product via the flow channel while the molten resin injection device injects molten resin from the gate into the cavity, wherein the pressure applied by the pressure keeping device is lower than injection pressure applied by the molten resin injection device, fluid pressure applied by the pressurized fluid injection device is lower than the pressure applied by the pressure keeping device, the pressure applied by the pressure keeping device is pressure that would not be sufficient to prevent a design surface of the molded product from separating from a surface of the cavity unless injecting the pressurized fluid by the pressurized fluid injection device, and the fluid pressure applied by the pressurized fluid injection device is pressure that would not be sufficient to prevent the design surface of the molded product from separating from the surface of the cavity unless applying the pressure by the pressure keeping device.

7. The apparatus as in claim 6, wherein the injection mold further comprises a stopper disposed at the opening of the flow channel, the stopper preventing the molten resin from entering to the flow channel through the opening.

8. The injection molding apparatus of claim 6, wherein the pressurized fluid injection device starts to inject the pressurized fluid after a tip of the molten resin flowing inside the cavity has passed through the opening of the flow channel.

9. The injection molding apparatus of claim 6, wherein the pressurized fluid injection device injects the pressurized fluid toward the back surface of the molded product via the flow channel while the pressure keeping device applies the pressure against the injected resin within the cavity.

\* \* \* \* \*